US008819794B2

(12) United States Patent
Eydelman et al.

(10) Patent No.: US 8,819,794 B2
(45) Date of Patent: Aug. 26, 2014

(54) INTEGRATING SERVER APPLICATIONS WITH MULTIPLE AUTHENTICATION PROVIDERS

(75) Inventors: Vadim Eydelman, Bellevue, WA (US); Brian Kress, Woodinville, WA (US); Matthias Leibmann, Woodinville, WA (US); Moustafa Noureddine, Redmond, WA (US); Lei Yu, Redmond, WA (US); Haibo Luo, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 52 days.

(21) Appl. No.: 13/354,324

(22) Filed: Jan. 19, 2012

(65) Prior Publication Data

US 2013/0191894 A1    Jul. 25, 2013

(51) Int. Cl.
*G06F 15/16* (2006.01)

(52) U.S. Cl.
USPC ........ 726/6; 726/9; 726/10; 726/13; 713/168; 713/182; 709/203; 709/206; 709/217; 715/764; 455/434

(58) Field of Classification Search
USPC ...................... 726/6, 9, 10, 13; 713/168, 182; 709/203, 206, 217; 715/764; 455/434
See application file for complete search history.

(56) References Cited

U.S. PATENT DOCUMENTS

| | | | |
|---|---|---|---|
| 6,052,590 A * | 4/2000 | Hicks et al. | 455/434 |
| 6,282,420 B1 * | 8/2001 | Bamburak et al. | 455/434 |
| 6,510,236 B1 | 1/2003 | Crane et al. | |
| 7,644,275 B2 * | 1/2010 | Mowers et al. | 713/168 |
| 7,805,489 B2 * | 9/2010 | Roberts | 709/206 |
| 8,020,196 B2 | 9/2011 | Randle et al. | |
| 8,171,535 B2 * | 5/2012 | Rubio et al. | 726/10 |
| 2004/0054885 A1 * | 3/2004 | Bartram et al. | 713/152 |
| 2006/0005239 A1 * | 1/2006 | Mondri et al. | 726/13 |
| 2006/0053279 A1 * | 3/2006 | Coueignoux | 713/154 |
| 2006/0230281 A1 | 10/2006 | Hofmann | |
| 2007/0118883 A1 | 5/2007 | Potter et al. | |
| 2007/0150737 A1 * | 6/2007 | Parupudi et al. | 713/175 |
| 2008/0046745 A1 | 2/2008 | Buch et al. | |

(Continued)

OTHER PUBLICATIONS

Shehab, et al., "ROAuth: Recommendation Based Open Authorization", Retrieved at <<http://cups.cs.cmu.edu/soups/2011/proceedings/a11_Shehab.pdf>>, Symposium on Usable Privacy and Security (SOUPS), Jul. 20-22, 2011, pp. 1-12.

(Continued)

*Primary Examiner* — Beemnet Dada
*Assistant Examiner* — Sayed Beheshti Shirazi
(74) *Attorney, Agent, or Firm* — Louise Bowman; James Ross; Micky Minhas (57) ABSTRACT

Online and on-premise applications identify trusted authentication providers. The applications are configured with a list of trusted issuers of authentication credentials. When an application receives a request requiring authentication, the application returns a 401 response that includes the trusted issuer list. The requesting application compares the trusted issuer list from the 401 response to its own list of authentication providers. If there is a match between the two lists, then the requesting application creates a self-issued token for the authentication provider. The authentication provider uses the self-issued token to generate an authentication token for the requesting application. The requesting application may also directly create a token for a target partner application, without an authentication provider, if there is a direct trust between the two applications.

14 Claims, 4 Drawing Sheets

(56) References Cited

U.S. PATENT DOCUMENTS

| | | | |
|---|---|---|---|
| 2008/0114832 A1* | 5/2008 | Bellinger et al. | 709/203 |
| 2008/0148345 A1* | 6/2008 | Rubio | 726/1 |
| 2008/0168543 A1 | 7/2008 | Krogh et al. | |
| 2009/0052440 A1* | 2/2009 | Pfeffer et al. | 370/352 |
| 2009/0287935 A1* | 11/2009 | Aull et al. | 713/182 |
| 2010/0063895 A1 | 3/2010 | Dominguez et al. | |
| 2010/0100953 A1* | 4/2010 | Mowers et al. | 726/10 |
| 2010/0122090 A1* | 5/2010 | Dean et al. | 713/168 |
| 2010/0251345 A1 | 9/2010 | James et al. | |
| 2010/0251353 A1 | 9/2010 | Hodgkinson | |
| 2010/0293487 A1* | 11/2010 | Schoenberg | 715/764 |
| 2012/0174207 A1* | 7/2012 | Zhu et al. | 726/9 |
| 2012/0278193 A1* | 11/2012 | Groat et al. | 705/26.1 |
| 2013/0007198 A1* | 1/2013 | Gupta et al. | 709/217 |

OTHER PUBLICATIONS

Christant, Ferdy, "How to Integrate Twitter and Facebook using oAuth", Retrieved at <<http://www.ferdychristant.com/blog/archive/DOMM-8B5JTP>>, Retrieved Date: Nov. 25, 2011, pp. 1-12.

Diana, Rob, "Web Application Integration With OAuth", Retrieved at <<http://regulargeek.com/2008/08/07/web-application-integration-with-oauth/>>, Aug. 7, 2008, pp. 1-6.

Mills, et al., "A SASL and GSS-API Mechanism for OAuth Draft-Mills-Kitten-SASL-OAuth-04.txt", Retrieved at <<http://tools.ietf.org/html/draft-mills-kitten-sasl-oauth-04>>, Oct. 31, 2011, pp. 1-25.

"International Search Report", Mailed Date: Apr. 29, 2013, Application No. PCT/US2013/021615, Filed Date: Jan. 16, 2013, pp. 8.

* cited by examiner

INTEGRATING SERVER APPLICATIONS WITH MULTIPLE AUTHENTICATION PROVIDERS

BACKGROUND

The deployment topologies of servers and services that are distributed across multiple on-premises and online environments become increasingly complex. Applications require secure access across these servers and services regardless of their deployment characteristics or location. Successful secure access is usually governed by authentication schemes support by the servers and services. Typically, a server or service that makes requests to another server or service needs to know how to authenticate the request so that it will be successful.

Standard authentication protocols, such as the OAuth protocol, can be used by servers and services for successful authentication. However, such standard protocols do not sufficiently describe how to build trust among the servers and services for them to succeed. Additionally, the existing authentication protocols do not consider complex deployment topologies that span the online and on-premise environments.

For example, the OAuth protocol often requires a single authentication server that all applications and services have to trust and rely on to successfully acquire credentials for authentication. However, many scenarios cannot use this single authentication server concept.

Additionally, while the OAuth protocol describes protocol flows in detail, the protocol leaves details on semantics and content of the protocol to a specific implementation of an authentication server. This means a server or service that integrates with one authentication server cannot necessarily rely on successfully using this same authentication server to make requests to another server or service that integrates with a different authentication server. In many scenarios, especially on-premise scenarios, servers or services cannot integrate with any authentication server at all.

Finally, after successful authentication, servers and services usually implement authorization mechanisms to protect resources from unwanted access. Usually these authorization mechanisms are proprietary to the service, but are based on the identity that is provided as part of the credentials queried for authentication. With the OAuth protocol, the client application is a verified and trusted identity. If the identity of the client application changes, the authorization must be reconfigured and the authentication is not available until verified with the new client application identity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments provide a general model for services and server applications to successfully authenticate using a standard authentication protocol, such as the OAuth 2.0 protocol. Servers and services may integrate with multiple authentication servers that implement different protocol semantics. Clients, such as other servers and services, may use the standard protocol in absence of an authentication server to access a relying party. Advertisement mechanisms are provided for relying parties that allow clients to select an appropriate issuer of credentials to authenticate to a relying party.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
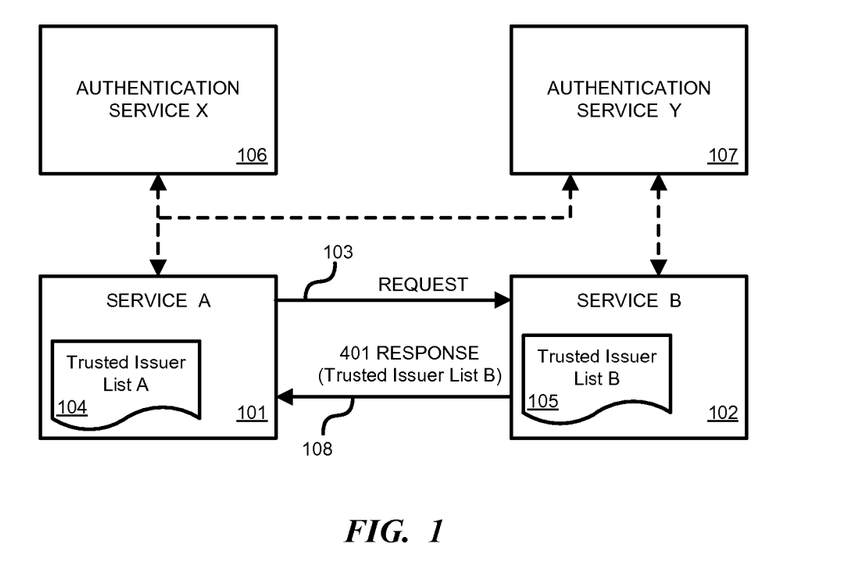
FIG. 1 illustrates two services communicating with each other to identify an acceptable authentication source.

FIG. 1 illustrates two services 101 and 102 communicating with each other to identify an acceptable authentication source. In some embodiments, services 101 and 102 may be located on the same server and/or on the same premises and may be configured by the same administrator. In other embodiments, services 101 and 102 may be located remotely from each other on separate servers and/or on separate premises and may be configured by different administrators. In such a configuration, servers 101 and 102 may communicate via a wireless or wired network, such as a local area network (LAN), wide area network (WAN), an intranet, or the Internet. These configurations may be referred to herein as an "on-premise" configuration. Where the services 101 and 102 are hosted environment in the cloud and are managed by separate hosting organizations, the configuration is referred to herein as an "online" configuration.

Services 101 and 102 may be separate instances of different applications or may be separate instances of the same application. In either case, users may desire to share information and data between services 101 and 102. For example, a user may want to work on service 101 and want to perform an action on service 102 or to exchange data with service 102. Service A 101 sends a request 103 to service B 102 to perform such an action or to exchange data. Before service B 102 acts on the request 103, service B 102 must authenticate the request 103. Service 101 is configured with a trusted issuer list 104 that identifies approved sources of authentication credentials or tokens. Similarly, service 102 has its own trusted issuer list 105. The trusted issuer lists may identify, for example, one or more authentication services 106, 107. Each service 101, 102 may have its own list of acceptable authentication services. For example, service 101 may trust authentication services 106 and 107, while service 102 may trust just authentication service 107.

In some direct-trust embodiments, services 101 and 102 may be able to self-authenticate or create their own authentication credentials or token.

Standard authentication protocols, such as the OAuth protocol, may be used to authenticate services 101 and 102 to each other. However, such protocols are not always successful because the services 101 and 102 may not share the same authentication service 106, 107 or may have incompatible authentication configurations.

When server 102 receives request 103, it returns 401 (unauthorized) response 108, which indicates that the request 103 requires authentication. The client may repeat the request 103 with a suitable Authorization header field. The Authorization field value consists of credentials containing the authentication information of the application for the realm of the resource being requested.

In one embodiment, 401-unauthorized response 108 includes a trusted issuer list 105 from the responding service 102. Accordingly, response 108 informs service 101 that the request 103 must be authenticated and provides a list of trusted sources from which service 101 can obtain the necessary authentication credentials or token. Service 101 has a list 104 of trusted or approved authentication services. Service 101 compares the received trusted list 105 to its own trusted list 104 and identifies any matches between the two lists. For example, if service 101 trusts authentication services 106 and 107, and service 102 trusts authentication service 107, then service 101 can use authentication service 107 to obtain the appropriate credentials.

The trusted issuer lists 104, 105 for services 101 and 102 may identify a hierarchy of preferred authentication sources. For example, trusted issuer list 104 may prioritize or rank the sources as (1) direct trust of other deployments of the same application, (2) authentication service 105, and (3) authentication service 106. In one embodiment, service 101 will compare its list 104 and received list 105 and will select the most-preferred issuer.

Figure 2:
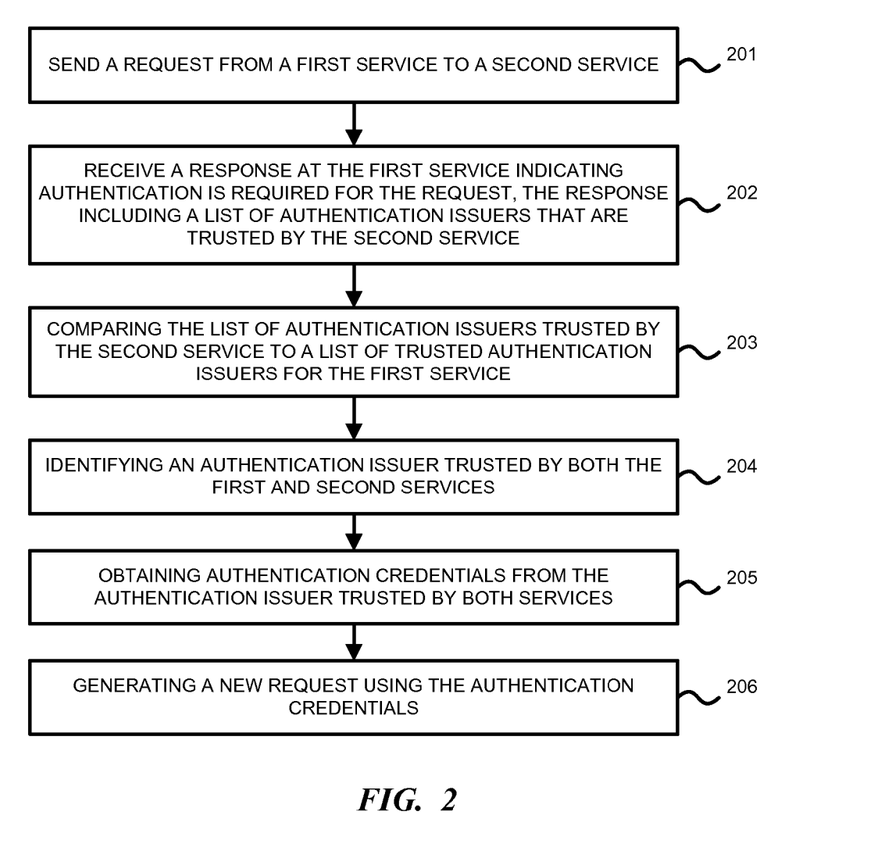
FIG. 2 illustrates a method or process for identifying a trusted issuer of authentication credentials.

FIG. 2 illustrates a method or process for identifying a trusted issuer of authentication credentials. In step 201, a request is sent from a first service to a second service. In step 202, the first service receives a response indicating that authentication is required for the request. The response includes a list of trusted authentication issuers for the second service. In step 203, the first service compares the list of trusted issuers from the second server to its own list of trusted issuers. In step 204, the first service identifies an authentication issuer that is trusted by both the first and second services.

In step 205, the first service obtains authentication credentials from the authentication issuer that is trusted by both services. In step 206, the first service generates a new request that includes the authentication credentials. Because the authentication credentials come from a source trusted by both services, the second service will typically accept the second request.

Configuration.

In order to participate in the trusted issuer identification process, each server or service must be configured with the appropriate information. In one embodiment, the following information is configured for each server or service.

Application Issuer Identifier. The application issuer identifier is used in the issuer field for self-issued tokens. The application issuer identifier has the format: PIDapp@realm. The required fields of the application issuer identifier are formatted as follows.

The PIDapp field is a principal identifier for the application. In one embodiment, this is a Globally Unique Identifier (GUID) that represents the current application. In other embodiments, any implementation that ensures uniqueness across these identifiers may be used. The Realm field may be the default domain for an on-premise installation. In an online installation, the Realm value may be a tenant identifier. However the tenant identifier is just one possible value of the Realm field, which may also be set to some other value.

Security Token Service (STS). One or more STS is also configured for each server or service. Each STS has the format: PIDsts@[TID], metadataURL.

The PIDsts field is a GUID that represents the STS.

The TID field is configured as follows:

For on-premise installations, the TID field is a tenant identifier (TenantID), which is a GUID or any implementation that ensures uniqueness to identify a specific tenant.

For most online installations, the TID field is empty (or *) and must be replaced by appropriate tenant ID.

For online installations within a specific tenant, which is needed for trust between tenants that represent the same company in different deployments, for example, the TID field is the TenantID.

The metadataURL field contains the URL that is used to retrieve the certificates for trust establishment with STS.

Some applications do not store issuer identifiers, but instead only store keys, key identifiers (e.g. certificate thumbprint), and metadata URLs.

Configured Partner Apps. The Configured Partner Apps has the format: PIDapp@[realm], {UseSTS|metadataURL}.

The PIDapp field is a GUID that represents a partner application (PA), such as another server or service.

The Realm field is empty (or *) for online installation and must be replaced by appropriate tenant ID. The Realm field holds the default domain for on-premise installation.

The UseSTS field is used to select whether incoming tokens for this PA must be issued by one of the configured STSs.

The metadataURL field is a URL that can be used to retrieve the certificates for direct trust with the application.

Some applications do not store issuer identifiers, but instead only store keys, key identifiers (e.g. certificate thumbprint), and metadata URLs.

Valid Domain or Realm List. The trusted issuer list is configured for online and on-premise configurations. For online installations, the trusted issuer list is a list of all tenant domain suffixes mapped by tenant. For on-premise installations, the trusted issuer list is a list of all valid domain suffixes.

In general, an empty realm is interpreted to mean the same as "*" realm. The "*" entry is used to support global configuration templates wherein a single configured entry can support millions of tenants to simplify configuration and storage requirements.

A realm is the identifier for a security boundary, and PIDs (principal IDs) are qualified by (i.e. unique relative to) a realm. A TID (Tenant Id) is a possible value string for a realm. TIDs are the primary names for realms in a datacenter. A DNS domain name is another possible value string for a realm used in on-premise configurations. DNS domain names may be sent as realm in an audience/resource to the STS, but the domain name is replaced by TID in the tokens the STS issues.

Publication of Issuer Information.

The list of issuers is returned in a 401 response to any request with a Bearer scheme in Authorization header that fails authentication.

Each application host constructs a list of trusted issuers from which it will accept tokens. In one embodiment, this list includes all STS from the configuration above and all partner applications that do not depend on STS for trust (i.e. all partner applications that will use direct trust). In some embodiments, applications that do not store issuer identifiers in the configuration data, but instead only keys and their identifiers, may not be able to construct the issuer list.

If issuer list cannot be constructed by the application, in one embodiment, the application returns its identifier (e.g. client_id) and realm in this case. The Realm value may be a tenant identifier. If an issuer list is constructed, the realm is optional and is typically provided in a pure on-premise deployment with direct trust (i.e. no STS) between applications or when the realm can be unambiguously determined from the endpoint URL of the application that produces a 401 response.

For example, the Request may be formatted as
POST/resource HTTP/1.1
Authorization: Bearer The 401 Response carries a comma separated list of issuers in the "trusted_issuers" parameter of the "Bearer" authentication scheme in the "WWW-Authenticate" header as follows:

HTTP/1.1 401 Unauthorized
WWW-Authenticate: Bearer trusted_issuers="PIDsts @*, PIDapp@realm", realm="realm", client_id="PID"

On-premise installations may publish PID, realm, and certificates in a metadata document to facilitate direct trust establishment between on-premise installations without STS. For online installations publication is not required.

Construction of Outbound Token

Figure 3A:
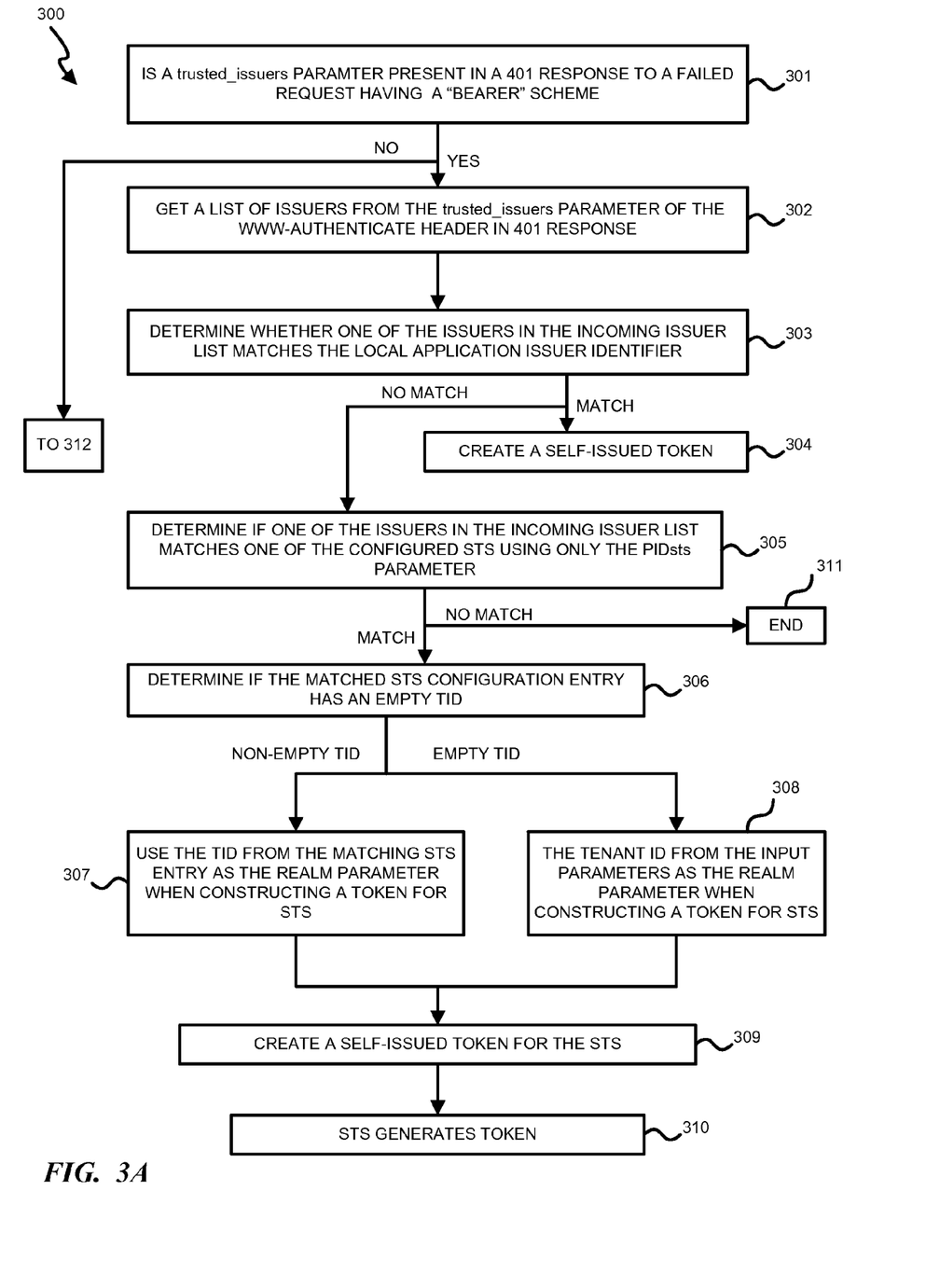
FIGS. 3A and 3B are a flow chart illustrating a method or process for construction of an outbound token for applications that use issuer match to select the issuer for an outbound token.
Figure 3B:
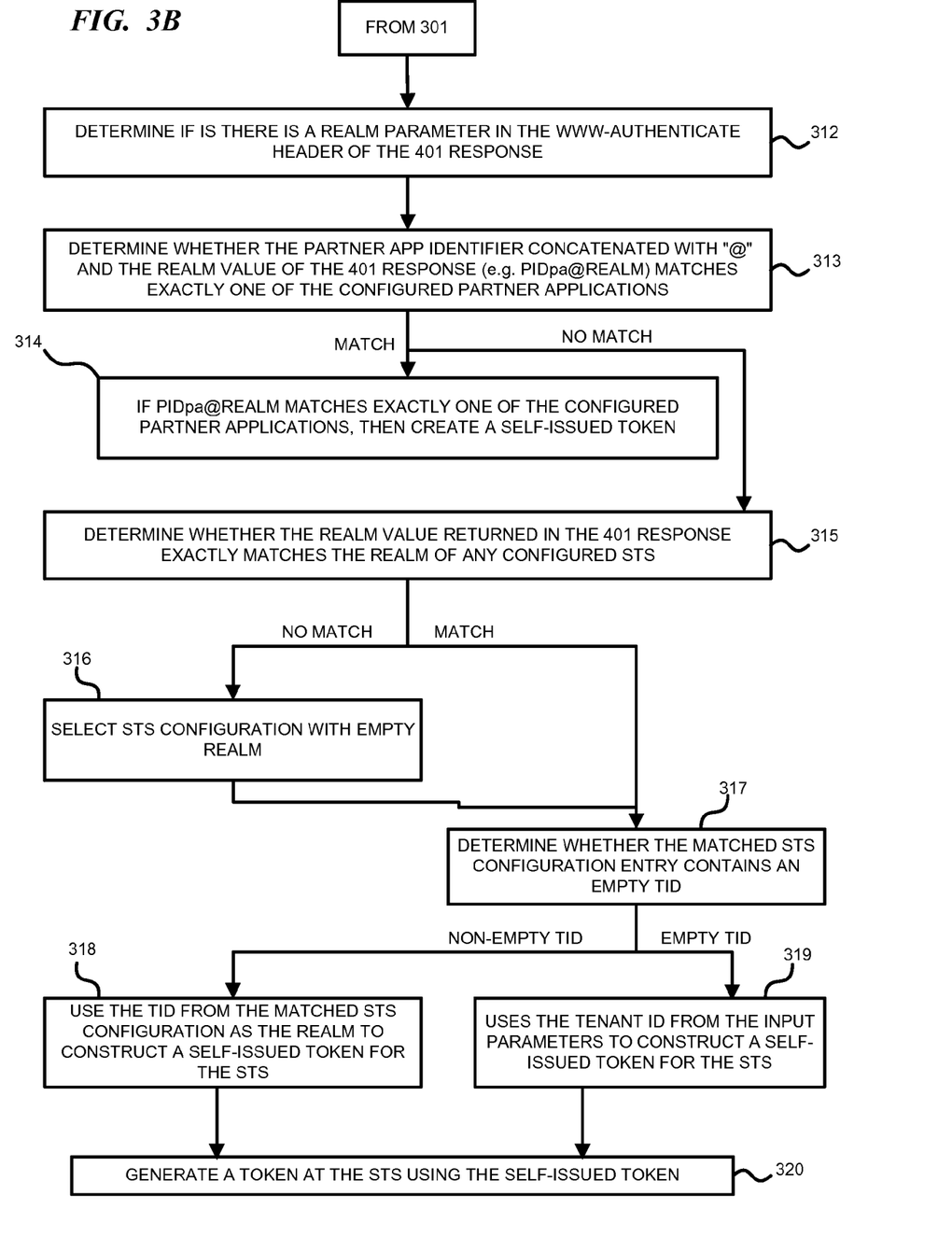

FIGS. 3A and 3B are a flow chart illustrating a method or process 300 for construction of an outbound token for applications that use issuer match to select the issuer for an outbound token. Process 300 has the following input parameters:

User or other URI having the format user@user-domain;
Partner App Identifier (PIDpa);
Destination Host (pahost);
Tenant ID (tid) for online configuration only; and
A list of outbound STS, which includes global STS, as well as entries for a specific tenant (online only).

In step 301, the application determines if a trusted_issuers parameter is contained in a 401 response that is received in reply to a failed request, wherein the request had a "Bearer" scheme. In step 302, the application gets a list of issuers (i.e. incoming issuer list) from the trusted_issuers parameter of the WWW-Authenticate header in 401 response message. If the trusted_issuers parameter is not present in the WWW-Authenticate header in the 401 response message, then the process moves to 312.

In step 303, the application determines whether one of the issuers in the incoming issuer list matches the local application issuer identifier (PIDapp@realm). In one embodiment, all of the PID and realm components must match exactly between the issuer on the incoming list and the local application issuer identifier.

If the PID and realm components match in step 303, then the process moves to step 304 to create a self-issued token. The self-issued token comprises the following elements:
iss: PIDapp@realm;
nameid: PIDapp@realm; and
aud: PIDpa@target-realm/pahost@user-domain.

The iss (issuer) and nameid (name identifier) elements correspond to the local application issuer identifier. The aud (audience) element is constructed based on ID of the partner application (PIDpa), the destination host (pahost), and the user domain (user-domain). The target-realm field is the realm of the application that the service is trying to call.

If there is no match to the local application issuer identifier in step 303, then the process moves to step 305. In step 305, the application determines if one of the issuers in the incoming issuer list matches one of the configured STS using only the PIDsts, which is the GUID represents the STS. The application ignores the realm parameter for this match. If there is a match in step 305, then, in step 306, the application determines if the matched STS configuration entry has an empty TID.

In step 307, if the matched STS configuration entry contains a non-empty TID, then the application uses the TID from the matching STS entry as the realm parameter when constructing the token for STS. Alternatively, in step 308, if the matching STS configuration entry has an empty TID, then the application uses the tenant ID from the input parameters above as the realm parameter when constructing the token for STS.

In step 309, the application creates a self-issued token for the STS. The self-issued token for the STS comprises the following parameters:
iss: PIDapp@tid;
nameid: PIDapp@tid;
aud: PIDsts@tid/pahost@user-domain; and
resource: PIDpa @target-realm/pahost@user-domain.

The iss/nameid PID element (PIDapp) comes from application issuer identifier. The realm element (tid) is selected from steps 307/308 and is based on either the configured STS TID or the tenant ID from the input parameters above. The aud PID element (PIDsts) comes from the STS configuration entry. The resource element is constructed based on ID of the partner application (PIDpa) and user-domain.

The self-issued token is then provided to the STS, which generates a token using the following parameters in step 310:
iss: PIDsts@tid;
nameid: PIDapp@tid; and
aud: PIDpa@tid/desthost@tid.

The STS uses its own issuer @ tenant ID for the iss element. The nameid element is validated and copied from the self-issued token. The aud element is validated and copied from the resource element of the token requesting parameters. If realm is provided as a DNS domain it is replaced with actual tenant ID. If realm is provided as a tenant id, no replacement is necessary.

If there is no match in steps 303 and 305, then a token cannot be created and the process ends in step 311.

If no trusted_isssuers parameter is present in the 401 response at step 301, then the process moves to step 312.

In step 312, the application determines if is there is a realm parameter in the WWW-Authenticate header of the 401 response. In step 313, the application determines whether the partner app identifier concatenated with "@" and realm value in the 401 response (e.g. PIDpa@realm) matches exactly one of the configured partner applications. If PIDpa@realm matches exactly one of the configured partner applications in step 313, and direct trust is configured, then the application creates a self-issued token in step 314. The self-issued token is formatted using the following parameters:
iss: PIDapp@realm;
nameid: PIDapp@realm; and
aud: PIDpa@realm/pahost@realm.

The iss and nameid elements (PIDapp@realm) correspond to the local application issuer identifier. The aud element is constructed based on the ID of the partner application (PIDpa) and the realm value returned in 401 response.

If there was no match in step 313 between PIDpa@realm and one of the configured partner applications, then the process moves to step 315. In step 315, the application determines whether the realm value returned in the 401 response exactly matches the realm of any configured STS.

If there is no exact match in step 315, then the application selects an STS configuration with an empty realm in step 316.

If there was a match in step 315 or 316, then the application determines whether the matched STS configuration entry contains an empty TID in step 317. If the matched STS configuration entry contains a non-empty TID, then in step 318 the application uses the TID from the matched STS configuration as the realm to construct a self-issued token for the STS. If matched STS configuration entry has an empty/ "*" realm, then in step 319 the application uses the realm [TID] from the input parameters above construct a self-issued token for the STS. The self-issued token has the following parameters:

iss: PIDapp@tid;
nameid: PIDapp@tid;
aud: PIDsts@tid/stshost@tid; and
resource: PIDpa@target-realm/pahost@user-domain.

The iss and nameid elements PID (PIDapp) come from the application issuer identifier. The aud element PID (PIDsts) comes from STS configuration entry. The realm for the iss, nameid, and aud elements (tid) is selected based on the configured STS TID or the tenant ID from the input parameters. The stshost element comes from the issuer endpoint in an STS metadata document, The resource element is constructed based on ID of the partner application (PIDpa) and the user-domain.

The self-issued token from steps 318 or 319 is then provided to the STS, which generates a token using the following parameters in step 320:

iss: PIDsts@tid;
nameid: PIDapp@tid; and
aud: PIDpa@tid/desthost@tid.

The STS uses its own issuer @ tenant ID for the iss element. The nameid element is validated and copied from the self-issued token. The aud element is validated and copied from the resource element of the self-issue token. If the DNS domain provided, then the DNS realm is replaced with actual tenant ID (tid). Otherwise, if the tenant id is provided, then no replacement is necessary.

If the steps of FIGS. 3A and 3B do not yield any matches, then the process stops and a token cannot be created.

For application that use a single outbound issuer, the application should just use that issuer to produce the token using the steps 317 through 320.

Validation of Inbound Token

If an application implements issuer identifier based token validation, the application gets the issuer identifier and locates the certificate for token signature validation. The application matches the issuer against its list of STS, which is part of the global configuration for the application. The PID in the issuer should match the STS configuration exactly. The realm should be matched only if it is specified (i.e. not empty) in the STS configuration entry. If STS configuration entry has empty realm or "*", then the realm value in the issuer identifier must be a valid tenant ID.

The token may be matched against the list of partner applications with direct trust. The list of applications with direct trust comes from the application's global configuration. In some embodiments, the direct trust may include applications from the tenant configuration. The tenant is looked up based on realm in the audience (aud:) field of the token. In one embodiment, all fields (PID@realm) must match exactly for direct trust and no wildcard matches are allowed. The PID and realm of the name identifier in the token must be the same as PID and realm of the issuer.

If there is no match, the application rejects the token. Otherwise, the application may retrieve the certificate. The certificate may be obtained from a metadata document associated with the STS or partner application. Alternatively, direct configuration of the certificate is also allowed.

If the application implements key identifier based token validation, then the application gets the key identifier, such as a certificate thumbprint from the token, and matches it against all valid key identifier in the configuration. If there is no match, then the application rejects the token. Otherwise, the application may retrieve the certificate from a metadata document associated with the key or may configure the certificate itself.

The application validates the token signature using the retrieved certificate.

In one embodiment, the application gets the name identifier and matches it against the partner application list. The PID should match exactly. The realm should be matched only if it is specified (i.e. not empty or "*") in the partner application configuration entry. If the partner application configuration entry has an empty realm, then the realm of name identifier must be the same as realm of the issuer.

The application gets the audience and matches its fields. The PID should exactly match the local application PID and host name through which the application was accessed. For STS-issued tokens, the realm should match the realm of the issuer (tenant ID). For application-issued tokens, the realm should match one of the locally configured global or tenant domains. For online or multi-tenant environments, the realm should be a valid tenant ID or a domain that resolves to a valid tenant.

It will be understood that the construction and validation of tokens as described herein may be used by two or more participants, which may include applications, servers, services, devices, products and the like. The participants may be configured to identify configured STS, partner applications, and trusted issuers. The participants then create, exchange and validate tokens as described above.

It will be understood that steps 201-206 of the process illustrated in FIG. 2 and steps 301-320 of the process illustrated in FIG. 3 may be executed simultaneously and/or sequentially. It will be further understood that each step may be performed in any order and may be performed once or repetitiously.

Figure 4:
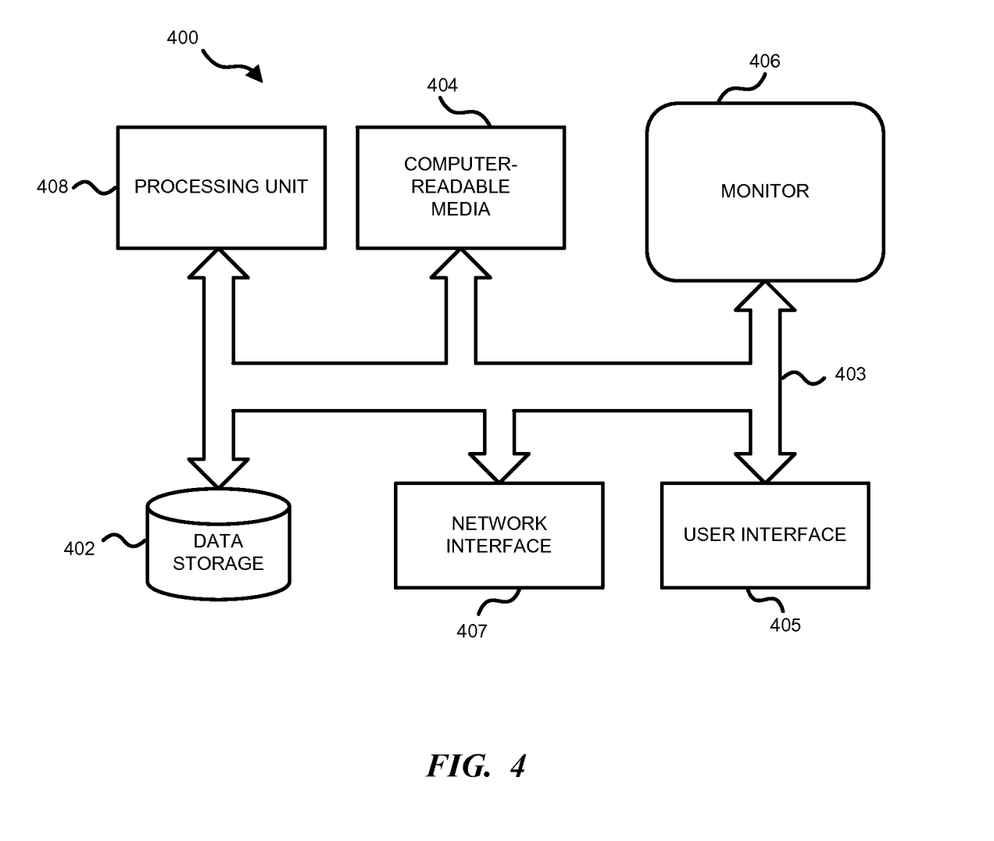
FIG. 4 illustrates an example of a suitable computing and networking environment on which the examples of FIGS. 1-3 may be implemented.

FIG. 4 illustrates an example of a suitable computing and networking environment 400 on which the examples of FIGS. 1-3 may be implemented. Authentication services, services and applications as described herein for obtaining authentication credentials may be embodied on computer system 400. The computing system environment 400 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 400. Components may include, but are not limited to, processing unit 408, data storage 402, such as a system memory, and system bus 403 that couples various system components including the data storage 402 to the processing unit 408. The system bus 403 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 400 typically includes a variety of computer-readable media 404. Computer-readable media 404 may be any available media that can be accessed by the computer 400 and includes both volatile and nonvolatile media, and removable and non-removable media, but excludes propagated signals. By way of example, and not limitation, computer-readable media 404 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 400. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 402 includes computer storage media in the form of volatile and/or nonvolatile memory such as read only memory (ROM) and random access memory (RAM). A basic input/output system (BIOS), containing the basic routines that help to transfer information between elements within computer 400, such as during start-up, is typically stored in ROM. RAM typically contains data and/or program modules that are immediately accessible to and/or presently being operated on by processing unit 408. By way of example, and not limitation, data storage 402 holds an operating system, application programs, and other program modules and program data.

Data storage 402 may also include other removable/non-removable, volatile/nonvolatile computer storage media. By way of example only, data storage 402 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 4, provide storage of computer-readable instructions, data structures, program modules and other data for the computer 400.

A user may enter commands and information through a user interface 405 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice input or natural user interface (NUI) may be used. These and other input devices are often connected to the processing unit 408 through a user input interface 405 that is coupled to the system bus 403, but may be connected by other interface and bus structures, such as a parallel port, game port or a universal serial bus (USB). A monitor 406 or other type of display device is also connected to the system bus 403 via an interface, such as a video interface. The monitor 406 may also be integrated with a touch-screen panel or the like. Note that the monitor and/or touch screen panel can be physically coupled to a housing in which the computing device 400 is incorporated, such as in a tablet-type personal computer. In addition, computers such as the computing device 400 may also include other peripheral output devices such as speakers and printer, which may be connected through an output peripheral interface or the like.

The computer 400 may operate in a networked environment using logical connections 407 to one or more remote computers, such as a remote computer. For example, authentication services, services and applications may communicate via network connections to obtain authentication credentials. The remote computer may be a personal computer, a server, a router, a network PC, a peer device or other common network node, and typically includes many or all of the elements described above relative to the computer 400. The logical connections depicted in FIG. 4 include one or more local area networks (LAN) and one or more wide area networks (WAN), but may also include other networks. Such networking environments are commonplace in offices, enterprise-wide computer networks, intranets and the Internet.

When used in a LAN networking environment, the computer 400 may be connected to a LAN through a network interface or adapter 407. When used in a WAN networking environment, the computer 400 typically includes a modem or other means for establishing communications over the WAN, such as the Internet. The modem, which may be internal or external, may be connected to the system bus 403 via the network interface 407 or other appropriate mechanism. A wireless networking component such as comprising an interface and antenna may be coupled through a suitable device such as an access point or peer computer to a WAN or LAN. In a networked environment, program modules depicted relative to the computer 400, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
sending, from a processing device, a request from a first application to a second application;
receiving, at the processing device, a response to the request, the response comprising a list of authentication issuers trusted by the second application;
comparing, with the processing device, the list of authentication issuers trusted by the second application to a list of authentication issuers approved for the first application; and
identifying an authentication issuer match between the lists;
  constructing a token, with the processing device, for an authentication issuer using a tenant identifier from an approved authentication issuer configuration;
  obtaining authentication credentials from the authentication issuer using the token; and
  generating, with the processing device, a revised request to the second application using the authentication credentials;
in response to determining that there is no match, determining whether a realm value in the response matches a configured authentication issuer; and
  using the tenant identifier to generate a self-issued token for the authentication issuer,
  wherein an approved authentication issuer configuration identifies a Globally Unique Identifier (GUID) for an approved authentication issuer and identifies the tenant identifier when an application is configured for an on-premise installation.

2. The method of claim 1, wherein the response is a 401 response indicating an unauthenticated request and wherein the list of authentication issuers trusted by the second application is transported in a WWW-Authenticate header of the 401 response.

3. The method of claim 1, further comprising:
using a Globally Unique Identifier (GUID) to determine whether an authentication issuer trusted by the second application matches an authentication issuer approved for the first application.

4. The method of claim 3, further comprising:
generating a set of input parameters; and
constructing a token for an authentication issuer using a tenant identifier from the input parameters.

5. The method of claim 1, further comprising:
using a Globally Unique Identifier (GUID) that matches an approved authentication issuer configuration and a tenant identifier from the approved authentication issuer configuration to create a self-issued token for the authentication issuer.

6. The method of claim 5, further comprising
receiving an authentication token from the authentication issuer, the authentication token generated by the authentication issuer using the self-issued token.

7. A method, comprising:
receiving, at an application running on a hardware processor, a response from a partner application, the response comprising a header having a realm parameter and an application identifier parameter;
concatenating the partner application identifier with the realm parameter to create a concatenated value;
determining whether the concatenated value matches an entry in a list of configured partner applications;
creating a self-issued token for the partner application or for an authentication issuer in response to determining that there is a match;
in response to determining that there is no match, determining whether a realm value in the response matches a configured authentication issuer; and
using a tenant identifier to generate a self-issued token for the authentication issuer, wherein an approved authentication issuer configuration identifies a Globally Unique Identifier (GUID) for an approved authentication issuer and identifies the tenant identifier when an application is configured for an on-premise installation.

8. The method of claim 7, wherein the self-issue token is adapted to be used by the authentication issuer to generate an authentication token.

9. The method of claim 7, further comprising:
configuring an application to identify partner applications and the approved authentication issuers.

10. The method of claim 9, wherein an approved authentication issuer configuration identifies a Globally Unique Identifier (GUID) for the approved authentication issuer but does not identify a tenant identifier when an application is configured for an online installation.

11. A computer system, comprising:
one or more processor devices;
system memory;
one or more computer-readable storage media having stored thereon computer-executable instructions that, when executed by the one or more processors, causes the processors to perform a method for generating authentication credentials, the processor operating to:
send a request from a first application to a second application;
receive a response to the request, the response comprising a list of authentication issuers trusted by the second application;
compare the list of authentication issuers trusted by the second application to a list of authentication issuers approved for the first application; and
identify an authentication issuer that matches both lists;
  construct a token for an authentication issuer using a tenant identifier from an approved authentication issuer configuration;
  obtain authentication credentials from the authentication issuer using the token; and
  generate a revised request to the second application using the authentication credentials;
in response to determining that there is no match, determining whether a realm value in the response matches a configured authentication issuer; and
  using the tenant identifier to generate a self-issued token for the authentication issuer,
  wherein an approved authentication issuer configuration identifies a Globally Unique Identifier (GUID) for an approved authentication issuer and identifies the tenant identifier when an application is configured for an on-premise installation.

12. The computer system of claim 11, wherein the response is a 401 response indicating an unauthenticated request and wherein the list of authentication issuers trusted by the second application is transported in a WWW-Authenticate header of the 401 response; and
wherein the processor further operates to:

use a Globally Unique Identifier (GUID) to determine whether an authentication issuer trusted by the second application matches an authentication issuer approved for the first application; and construct a token for an authentication issuer using a tenant identifier from an approved authentication issuer configuration.

13. The computer system of claim 11, wherein the response is a 401 response indicating an unauthenticated request and wherein the list of authentication issuers trusted by the second application is transported in a WWW-Authenticate header of the 401 response; and wherein the processor further operates to:

use a Globally Unique Identifier (GUID) to determine whether an authentication issuer trusted by the second application matches an authentication issuer approved for the first application;

generate a set of input parameters; and construct a token for an authentication issuer using a tenant identifier from the input parameters.

14. The computer system of claim 11, wherein the one or more processor devices further operates to:

receive an authentication token from the authentication issuer, the authentication token generated by the authentication issuer using the self-issued token.

* * * * *